UNITED STATES PATENT OFFICE.

JOHN C. SOJEBA, OF CLEVELAND, OHIO.

PULLEY-CLUTCH.

No. 806,373.　　　Specification of Letters Patent.　　　Patented Dec. 5, 1905.

Application filed May 3, 1905. Serial No. 258,616.

*To all whom it may concern:*

Be it known that I, JOHN C. SOJEBA, a citizen of the United States, residing at Cleveland, in the county of Cuyahoga and State of Ohio, have invented new and useful Improvements in Pulley-Clutches, of which the following is a specification.

This invention is a clutch particularly adapted for split pulleys.

The object of the invention is to produce a device which will avoid the necessity for keying the pulley onto the shaft and which will allow a shrinkage in the pulley to be taken care of to avoid its becoming loose on the shaft. The clutch catches in only one direction, so that it is useful where back slip on reverse motion is desired.

Figure 1:
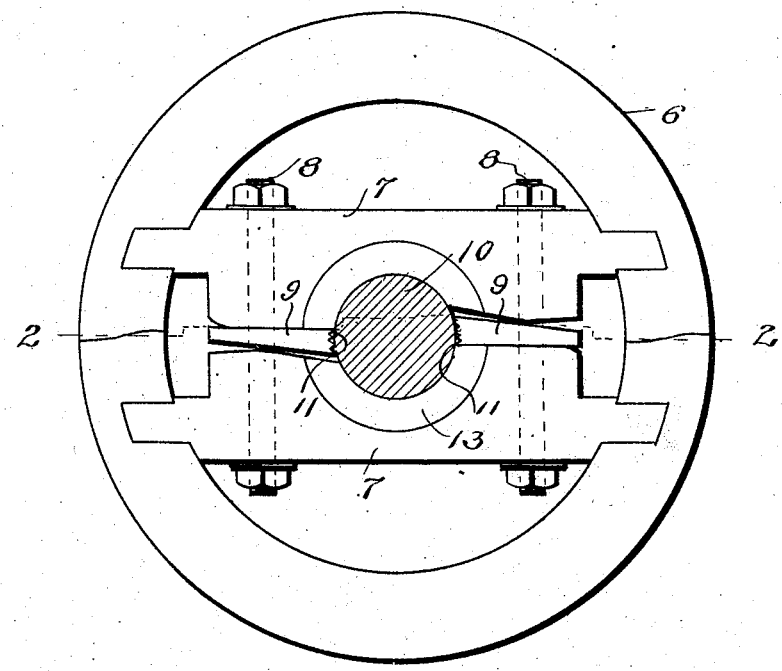
Figure 2:
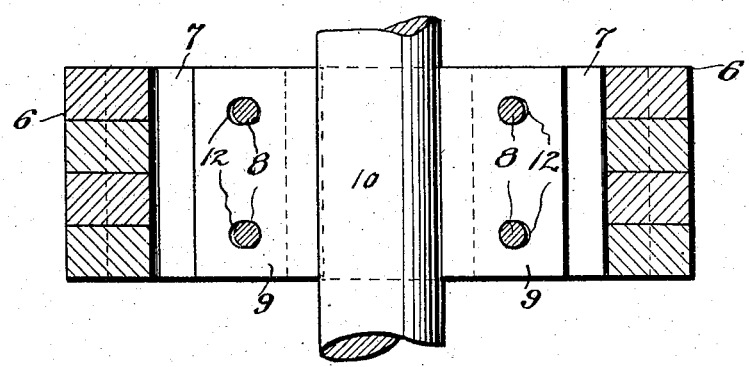

In the accompanying drawings, Figure 1 is a side elevation of a pulley provided with the clutch. Fig. 2 is a section on the line 2 2 of Fig. 1.

Referring specifically to the drawings, 6 indicates a pulley-rim formed of bent wood sections in a well-known manner. Each part has a cross-bar 7 mortised into the rim. The bolts 8, which clamp the two parts of the pulley together, extend through these bars. The bars do not meet at the diametrical line, as usual, but a space is left therebetween to receive a dog 9 on each side of the shaft 10. Each of these dogs consists of a steel plate having at its inner edge teeth 11 and having openings, as indicated at 12, through which the bolts 8 extend loosely. The plates forming the dogs do not fit closely between the bars 7, but have sufficient space to swing to and from the shaft to engage or disengage the same, although they are confined by the bars and the bolts, so that they will engage the shaft when it is rotated in the driving direction. The bearing bushing or eye 13, located between the bars 7 and the shaft, is split or formed in two sections, with spaces between the ends thereof through which the dogs project to contact with the shaft.

In operation when the shaft is driven in the driving direction the dogs take hold on its surface and back up against the bolts 8 and the bars 7, the angle of the dog and the radius of the shaft being very oblique, so as to insure a clutch even on the smooth surface of the shaft. If and when a pulley shrinks, the space between the bars 7 allows the shrinkage to be taken up, so that gaps and breaks in the rim are prevented and tightness assured. On reverse motion of the shaft the dogs slip and the pulley becomes loose.

This invention will be found to obviate the defects incident to split wood pulleys and the difficulty of keeping the parts tight and at a close fit. The spaces left or formed between the bars 7 extend entirely across the pulley. Consequently the dogs can be made as broad as desired, thus giving a wide hold on the shaft. The same invention may be applied to pulleys which are not split by providing similar spaces in the hub of the pulley and hanging or supporting dogs therein. The device is also capable of application to gear-wheels and other mechanical members.

What I claim as new, and desire to secure by Letters Patent, is—

1. The combination with a split wheel each section of which has a cross-bar extending between its ends, and bolts connecting the cross-bars, of dogs supported on said bolts, between the bars, and arranged to clutch the shaft.

2. The combination with a wheel having recesses extending across its hub and along the eye thereof, of dogs comprising relatively wide plates loosely held in said recesses with their longer edges extending parallel to the shaft and projecting at one edge into the eye and adapted to clutch the shaft.

In testimony whereof I have signed my name to this specification in the presence of two subscribing witnesses.

JOHN C. SOJEBA.

Witnesses:
JOHN H. O'BRIEN,
JOHN A. BOMMHARDT.